(12) United States Patent
Kim et al.

(10) Patent No.: US 11,341,529 B2
(45) Date of Patent: May 24, 2022

(54) WEARABLE DEVICE AND METHOD FOR PROVIDING WIDGET THEREOF

(71) Applicant: Samsung Electronics Co., Ltd., Suwon-si (KR)

(72) Inventors: Tae-jeoung Kim, Hwaseong-si (KR); Hyun-hak Kim, Seoul (KR); Hong-uk Woo, Seoul (KR); Ki-chul Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 126 days.

(21) Appl. No.: 16/335,943

(22) PCT Filed: Sep. 8, 2017

(86) PCT No.: PCT/KR2017/009858
§ 371 (c)(1),
(2) Date: Mar. 22, 2019

(87) PCT Pub. No.: WO2018/056617
PCT Pub. Date: Mar. 29, 2018

(65) Prior Publication Data
US 2019/0311401 A1    Oct. 10, 2019

(30) Foreign Application Priority Data
Sep. 26, 2016  (KR) .................. 10-2016-0123288

(51) Int. Cl.
*G06Q 30/02* (2012.01)
*G06F 1/16* (2006.01)
(Continued)

(52) U.S. Cl.
CPC ........... *G06Q 30/0255* (2013.01); *G06F 1/16* (2013.01); *G06F 1/163* (2013.01); *G06F 3/0346* (2013.01);
(Continued)

(58) Field of Classification Search
CPC ...... G06Q 30/0255; G06Q 30/02; G06F 1/16; G06F 1/163; G06F 3/0346; G06F 3/0481;
(Continued)

(56) References Cited

U.S. PATENT DOCUMENTS 8,954,489 B2    2/2015 Park et al.
8,954,871 B2    2/2015 Louch et al.
(Continued)

FOREIGN PATENT DOCUMENTS

JP    6739574 B2 *  8/2020 ......... G06Q 30/0255
KR    10-2010-0134495 A    12/2010
(Continued)

OTHER PUBLICATIONS

M. Bohmer, G. Bauer, and A. Kruger, "Exploring the design space of context-aware recommender systems that suggest mobile applications", 2nd Workshop on Context-Aware Recommender Systems, Assoc. Comp. Machinery, 2010, 5 pages. (Year: 2010) (Year: 2010).*

(Continued)

*Primary Examiner* — Dipen M Patel
(74) *Attorney, Agent, or Firm* — Jefferson IP Law, LLP

(57) ABSTRACT

A wearable device and a method for providing a widget thereof are provided. A method for providing a widget in a wearable device of the present disclosure comprises the steps of: sensing status information of a user; transmitting the status information of the user to an external server; selecting an application type to be provided from the external server according to a user command; receiving, from the external server, information on at least one application corresponding to the status information of the user on the basis of the selected application type and the status infor- (Continued)

mation of the user; and providing, on a screen, a widget corresponding to an application selected by the user among the at least one application.

13 Claims, 14 Drawing Sheets

(51) Int. Cl.
*G06F 3/0346* (2013.01)
*G06F 3/04817* (2022.01)
*G06F 3/04842* (2022.01)
*G06F 3/0485* (2022.01)
*G06F 3/0484* (2022.01)
*G06F 3/0481* (2022.01)

(52) U.S. Cl.
CPC .......... *G06F 3/0481* (2013.01); *G06F 3/0484* (2013.01); *G06F 3/0485* (2013.01); *G06F 3/04817* (2013.01); *G06F 3/04842* (2013.01); *G06Q 30/02* (2013.01); *G06F 2200/163* (2013.01)

(58) Field of Classification Search
CPC ............... G06F 3/04817; G06F 3/0484; G06F 3/04842; G06F 3/0485; G06F 2200/163; G06F 3/014; G06F 3/0488
See application file for complete search history.

(56) References Cited

U.S. PATENT DOCUMENTS

| | | | |
|---|---|---|---|
| 9,135,665 B2* | 9/2015 | England | G06Q 50/01 |
| 9,449,106 B2* | 9/2016 | Reese | G06F 16/248 |
| 10,555,045 B2* | 2/2020 | Shaw | H04N 21/26258 |
| 10,956,956 B2* | 3/2021 | Bhardwaj | G06Q 30/0631 |
| 2009/0249359 A1 | 10/2009 | Caunter et al. | |
| 2011/0307354 A1* | 12/2011 | Erman | G06Q 30/0282 705/27.1 |
| 2012/0158775 A1* | 6/2012 | Choi | G06F 16/907 707/769 |
| 2013/0159234 A1* | 6/2013 | Xing | H04M 1/72569 706/46 |
| 2013/0339345 A1* | 12/2013 | Soto Matamala | H04W 40/242 707/722 |
| 2014/0007010 A1* | 1/2014 | Blom | G06F 3/0481 715/825 |
| 2014/0047005 A1* | 2/2014 | Radar | G06Q 30/0241 709/203 |
| 2014/0052567 A1 | 2/2014 | Bhardwaj et al. | |
| 2014/0123022 A1* | 5/2014 | Lee | H04M 1/72572 715/747 |
| 2014/0365970 A1* | 12/2014 | Jeong | G06F 9/451 715/835 |
| 2015/0046828 A1* | 2/2015 | Desai | G06F 1/163 715/739 |
| 2015/0066643 A1* | 3/2015 | Choi | G06Q 30/0255 705/14.53 |
| 2015/0347912 A1* | 12/2015 | Rodzevski | G01P 15/02 706/11 |
| 2016/0063569 A1 | 3/2016 | Williams | |
| 2016/0150071 A1* | 5/2016 | Kim | G06F 3/0488 455/414.2 |
| 2016/0241553 A1* | 8/2016 | Kim | H04L 63/0861 |
| 2016/0360336 A1* | 12/2016 | Gross | H04M 1/72403 |
| 2017/0075551 A1* | 3/2017 | Robinson | G06F 3/04817 |
| 2017/0140285 A1* | 5/2017 | Dotan-Cohen | G06F 3/01 |
| 2017/0168691 A1* | 6/2017 | Johansson | G06F 9/44505 |

FOREIGN PATENT DOCUMENTS

| | | | | |
|---|---|---|---|---|
| KR | 10-2012-0057256 A | 6/2012 | | |
| KR | 10-2012-0087253 A | 8/2012 | | |
| KR | 10-2014-0101270 A | 8/2014 | | |
| KR | 10-2015-0111834 A | 10/2015 | | |
| KR | 10-2015-0128482 A | 11/2015 | | |
| KR | 10-1572928 B1 | 12/2015 | | |
| KR | 20160076394 A * | 6/2016 | ............. | G06F 3/048 |
| KR | 10-2016-0101497 A | 8/2016 | | |

OTHER PUBLICATIONS

S. Acharya, A. Shenoy, M. Lewis and N. Desai, "Analysis and Prediction of Application Usage in Android Phones," 2016 2nd International Conference on Advances in Electrical, Electronics, Information, Communication and Bio-Informatics (AEEICB), 2016, pp. 530-534, doi: 10.1109/AEEICB.2016.7538346. (Year: 2016).*
Bohmer etal., "Exploring the design space of context-aware recommender systems that suggest mobile applications", Comp. Machinery, 2010, https://www.researchgate.net/publication/228749868_Exploring_the_design_space_of_context-aware_recommender_systems_that_suggest_mobile_applications. (Year: 2010).*
Sergio Ilarri, Ramón Hermoso, Raquel Trillo-Lado, and María del Carmen Rodríguez-Hernández. 2016. A review of the role of sensors in mobile context-aware recommendation systems. Int. J. Distrib. Sen. Netw. 2015, Article 226 (Jan. 2015), 1 pages. DOI:https://doi.org/10.1155/2015/489264. (Year: 2015).*
Macias, E.; Suarez, A.; Lloret, J. Mobile Sensing Systems. Sensors 2013, 13, 17292-17321. https://doi.org/10.3390/s131217292 (Year: 2013).*
Miyamae et al., "Design and implementation of an extensible rule processing system for wearable computing," The First Annual International Conference on Mobile and Ubiquitous Systems: Networking and Services, 2004. MOBIQUITOUS 2004., 2004, pp. 392-400, doi: 10.1109/MOBIQ.2004.1331746 (Year: 2004).*

\* cited by examiner

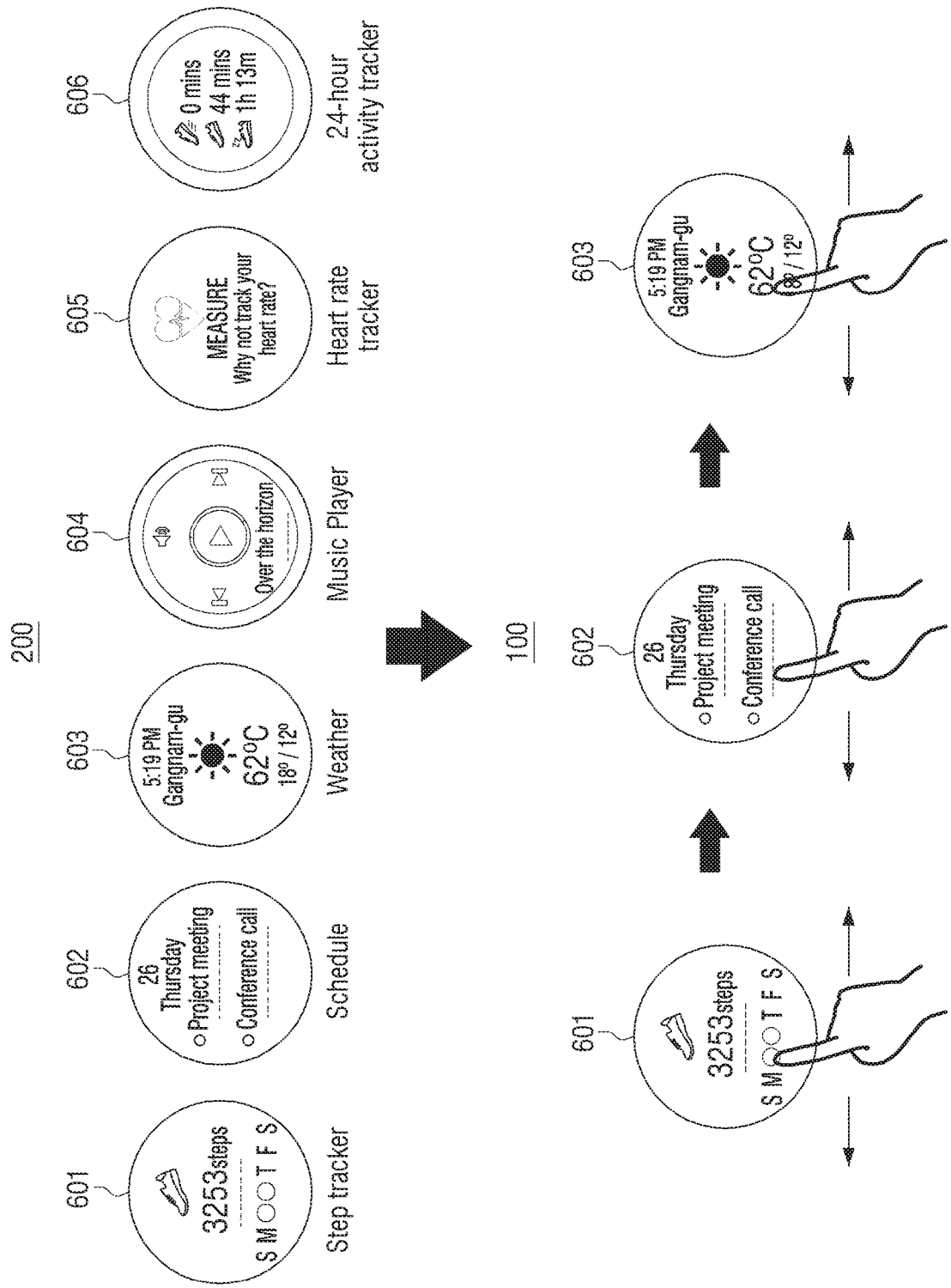

1000-1         1000-2         1000-3

WEARABLE DEVICE AND METHOD FOR PROVIDING WIDGET THEREOF

TECHNICAL FIELD

Devices and methods consistent with what is disclosed herein relate to a wearable apparatus and a method for providing a widget, and more particularly, to a wearable apparatus capable of sensing status information of a user through a sensor and automatically providing a widget corresponding to the status information of the user and a method for providing a widget.

BACKGROUND ART

A variety of icons are placed on a screen of a mobile device including a wearable apparatus. To be specific, the mobile device screen is featured with icons (hereinafter 'widget') having a widget function for displaying a specific content and/or a specific screen of an application (e.g., weather, calendar, etc.) without using applications (e.g., email, camera, contact list, etc.) or web-browsers (e.g., Internet, etc.). Generally, when a user touches a widget, an operation corresponding to the widget is performed or an application connected to the widget is launched.

The size of the wearable apparatus is limited compared to a mobile device such as a smartphone, etc. Therefore, a method for providing a widget to a user of a wearable apparatus is limited compared to a mobile device such as a smartphone, etc.

For example, in a smartphone, a widget is placed in a specific area of a display, and a plurality of widgets are located in one screen. Therefore, a user simultaneously checks information on a plurality of widgets and selects a widget that the user desires to pick up in a smartphone. In addition, user interaction through a widget is freely made in a smartphone.

However, in a case of a smart watch, a single widget takes an entire area of a screen. Therefore, the wearable apparatus is limited to support widgets of various sizes in one screen, and user interaction is also limited. In addition, when a user wishes to obtain information on another widget in a wearable apparatus, the information on another widget could be acknowledged through a user input (e.g., touching, swiping, flicking, etc.) with respect to the widget downloaded and mounted in the smart watch.

Therefore, a widget providing technique for maximizing user convenience in a wearable apparatus having a small display has been in high demand.

DISCLOSURE

Technical Problem

An aspect of the exemplary embodiments relates to providing a wearable apparatus capable of automatically providing a personalized widget based on status information of a user and a method for providing a widget.

Technical Solution

According to an embodiment, there is provided a wearable apparatus including a sensor configured to sense status information of a user, a communicator configured to transmit the status information of the user to an external server, and a processor configured to select an application topic to be provided from the external sever according to a user command, receive information on at least one application corresponding to the status information of the user from the external server through the communicator based on the selected application topic and the status information of the user, and provide a widget corresponding to an application selected by a user from among the at least one application on a screen.

According to an embodiment, there is provided a method for providing a widget of a wearable apparatus, the method including sensing status information of a user, transmitting the status information of the user to an external server, selecting an application topic to be provided from the external server according to a user command, receiving information on at least one application corresponding to the status information of the user from the external server based on the selected application topic and the status information of the user, and providing a widget corresponding to an application selected by a user from among the at least one application on a screen.

Advantageous Effects

According to the above-described various embodiments, a wearable apparatus may automatically provide a widget suitable for a user's situation (e.g., an activity topic) adaptively according to the change of status information of a user.

A wearable apparatus according to an embodiment may provide a widget suitable for user's state (status) without an additional user input (e.g., touching, swiping, flicking, bezel manipulation, etc.) with respect to a plurality of widgets for changing a widget to be user according to user's status.

A service publisher, which is a widget provider, may not the developed widget to a user through an advertisement, etc. but may provide a widget corresponding to an application topic to be provided to a user to the user to so that widget information could be exposed to the user naturally through a widget producing system.

A wearable apparatus according to an embodiment may increase a memory use efficiency of a wearable apparatus because a widget is not mounted on a wearable apparatus, but only widget UI data is provided from a server according to status information of a user.

DESCRIPTION OF DRAWINGS

FIG. 6C is a view to explain a method for providing a widget of a wearable apparatus according to an embodiment of the disclosure;

BEST MODE

Figure 1:
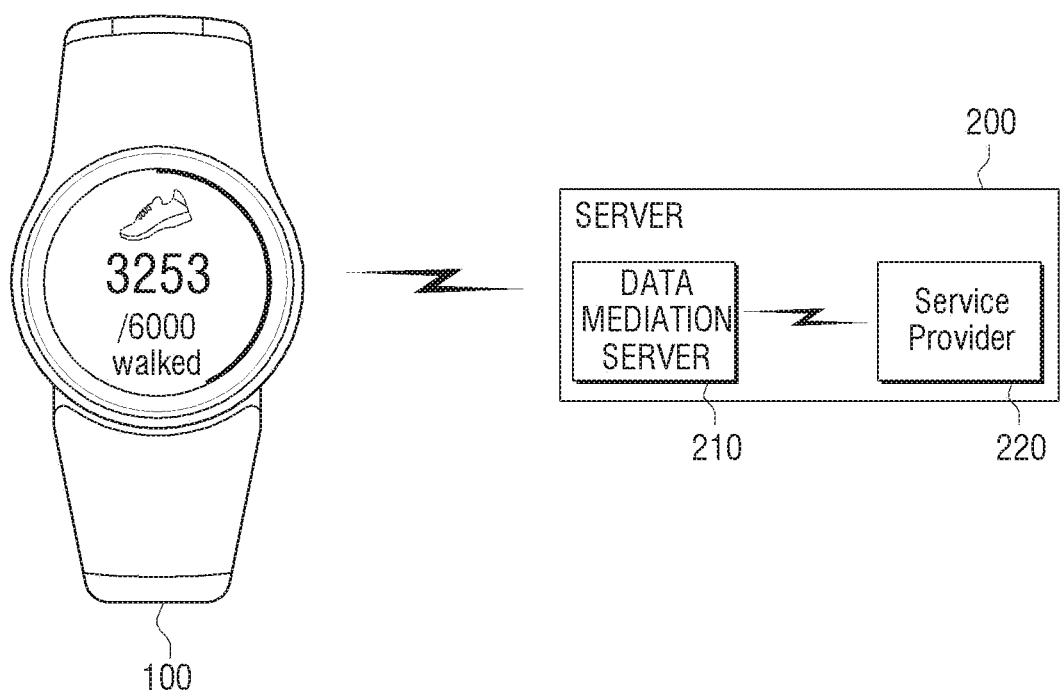
FIG. 1 is a view illustrating a system according to an embodiment of the disclosure.

Hereinafter, embodiments according to the disclosure will be described in detail with reference to the contents described in the accompanying drawings. In addition, a method of manufacturing and using the disclosure will be described in detail with reference to the description of the attached drawings. Like reference numbers or designations in the various drawings indicate components or components that perform substantially the same function.

The term 'and/or' includes any combination of a plurality of related listed items or any of a plurality of related listed items.

The terminology used herein will be described in detail below with reference to the examples described in the accompanying drawings. In addition, a method of manufacturing and using the invention will be described in detail with reference to the description of the attached drawings. Like reference numbers or designations in the various drawings indicate components or components that perform substantially the same function.

The term 'and/or' includes any combination of a plurality of related listed items or any of a plurality of related listed items.

The terms used in the application are merely used to describe particular exemplary embodiments, and are not intended to limit the invention. Singular forms in the invention are intended to include the plural forms as well, unless the context clearly indicates otherwise.

The singular expression also includes the plural meaning as long as it does not differently mean in the context. In this specification, terms such as 'include' and 'have/has' should be construed as designating that there are such features, numbers, operations, elements, components or a combination thereof in the specification, not to exclude the existence or possibility of adding one or more of other features, numbers, operations, elements, components or a combination thereof.

The 'widget' of the disclosure is configured to be movable in a wearable apparatus, user-interactive, and executable in an application. The 'widget' may be embodied to serve as an icon of an application mounted in a screen of a wearable apparatus.

When the user selects 'widget' on a screen of a wearable apparatus, an application corresponding to a widget may be executed so that a content may be provided. According to an embodiment, although the user may not select 'widget' from the screen of the wearable apparatus, an application corresponding to a widget may be executed according to status information of a user to provide a content.

The 'widget' may make it possible to access a specific content through an icon displayed on a screen of a wearable apparatus without going through an application (e.g., email, camera, contact list, etc.) or a web-browser (e.g., Internet, etc.) and provide a user with specific content and/or browser information (e.g., weather, health care, news, etc.) The 'content' may be at least one of text, image, sound, and video, or data containing information such as coupon, ticket, or the like, but is not limited thereto.

The 'user status information' may be data sensed through various sensors included in a wearable apparatus. The wearable apparatus may directly determine status information of a user based on data sensed by a sensor and transmit the status information to a server. In addition, the server may determine status information of a user (e.g., an activity topic) based on sensing data (user's status information) received from the wearable apparatus. For example, the 'user status information' may be data for the movement and speed of the user sensed by an acceleration sensor or a motion sensor, or data related to user's location information sensed by a GPS module, but is not limited thereto.

FIG. 1 is a view illustrating a system according to an embodiment of the disclosure.

Referring to FIG. 1, a system 10 may include a wearable apparatus 100 and a server 200. The server 200 may include a data mediation server 210, which is a context data server, and a service provider 220, which is a service publisher. The server 200 may be included in the wearable apparatus 100, or may be an external server such as a cloud server. When the server 200 is an external server, the wearable apparatus 100 may receive or transmit data via various wired/wireless communication methods. In this disclosure, a cloud service based external server will be exemplified as the server 200, but it is not limited thereto.

The system 10 may be publishing/subscribing system. Generally, the publishing/subscribing system 10 may include a service provider 220 for publishing a widget service, a wearable apparatus 100 as a data subscriber for data exchange by way of subject or topic between the service provider 200 and the service, and a data mediation server 210 for matching data to be subscribed by the wearable apparatus 100 with service provided from the service provider 220 and providing the data to the wearable apparatus 100. The subscriber may be various types of electronic apparatuses, but an embodiment of the disclosure is limited to the wearable apparatus 100.

The wearable apparatus 100 may be a small-sized electronic apparatus that can be worn in a body. For example, the wearable apparatus 100 may be a smart watch, a head-mounted display, a smart glass, etc. but is not limited thereto.

According to an embodiment, the server 200 may be a server in a publishing/subscribing system, and the server 200 may analyze user status information received from the wearable apparatus 100 and store the information in a database. In addition, the server 200 may identify an application corresponding to the user status information among application topics selected according to a user command, and transmit information on the identified application to the wearable apparatus 100.

To be specific, the service provider 220 may include a plurality of publishers, and each publisher may produce content data (e.g., a widget content) corresponding to the service (e.g., weather, healthcare, news, etc.) subscribed by the wearable apparatus 100, which is a subscriber. The service provider 220 may register and publish the produced widget contents in the data mediation server 200 by topic. The wearable apparatus 100 may transit the user status information sensed by various sensors to the data mediation server 210. The data mediation server 210 may analyze the user status information received from the wearable apparatus 100 and recognize a context of a user. For example, the context of the user may vary such as the user is driving, the user enters a shopping mall, or the user is running, etc. according to an activity type of the user using the wearable apparatus 100.

The data mediation server 210 may store application topic application to be subscribed by a user, which is requested from the wearable apparatus 100 (e.g., a widget list according to a topic, etc.) in a databased which is a repository of the data mediation server 210. The data mediation server 210 may divide widget contents published by the service provider 220 by contextual information received from the wearable apparatus 100 and store the contents in a repository. Therefore, the data mediation server 210 may automatically provide the widget content in the context of the wearable apparatus 100 to the wearable apparatus 100. The details of the system 10 according to an embodiment of the disclosure will be described with reference to FIG. 3, FIG. 4 and FIG. 5.

Figure 2:
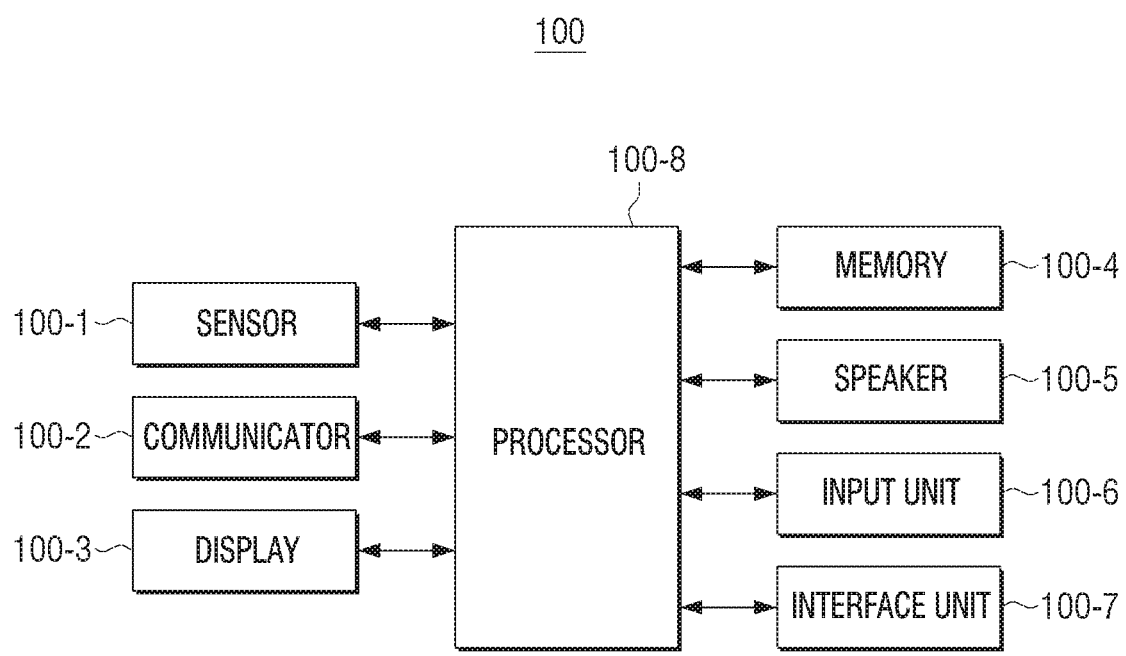
FIG. 2 is a detailed block diagram to explain a wearable apparatus according to an embodiment of the disclosure.

FIG. 2 is a detailed block diagram of a wearable apparatus according to an embodiment of the disclosure.

Referring to FIG. 2, a wearable apparatus 100 may include a sensor 100-1, a communicator 100-2, a display 100-3, a memory 100-4, a speaker 100-5, an input unit 100-6, an interface unit 100-7, and a processor 100-8. However, such constituent elements are only exemplary, but in actual implementation, constituent elements may be further added or changed.

The sensor 100-1 may include at least one sensor for sensing at least one of information on the environment near the wearable apparatus 100 and user status information. According to an embodiment, the information on the environment near the wearable apparatus 100 may also be included in the user status information. For example, the environment information of the wearable apparatus 100 may be temperature, pressure, humidity, noise, etc., but is not limited thereto.

For example, the sensor 100-1 may be a proximity sensor, an illumination sensor, a touch sensor, an acceleration sensor, a magnetic sensor, a gravity sensor such as a G-sensor, a gyroscope sensor, a motion sensor, an infrared sensor, an ultrasonic sensor, an environmental sensor (e.g., barometer, hygrometer, thermometer, heat sensing sensors, etc.), a healthcare sensor, and a biometric sensor. The sensor described above is not limited to only one embodiment.

The communicator 100-2 may establish communication between the wearable apparatus 100 and the external device (e.g., an external server such as a cloud server, another electronic apparatus, etc.). The communicator 100-2 may be connected to a network through wired communication or wireless communication and perform communication with the external device.

The wireless communication may be performed in at least one wireless communication system such as a wireless fidelity (WFI), a Bluetooth (BT), a near field communication (NFC), a global positioning system (GPS), or a cellular communication (e.g., LTE, LTE-A, CDMA, WCDMA, UMTS, Wibro GSM, etc.). The wired communication may include at least one of a universal serial bus (USB), a high definition multimedia interface (HDMI), a recommended standard 232 (RS-232) or a plain old telephone service (POTS).

The communicator 100-2 may transmit at least one of user status information sensed by the sensor 100-1 and environment information of the wearable apparatus 100 to an external server. The communicator 100-2 may receive information on an application corresponding to user status information from the external server.

The communicator 100-2 may transmit application topic information to be provided (to be subscribed) from an external server selected according to a user command, and receive application topic information to be provided from the external server among application topic information selected according to a user command.

The communicator 100-2 may include a GPS module. The GPS module may receive location information of the wearable apparatus 100.

The display 100-3 may provide application topic information provided from an external server (e.g., a subscriptionable topic widget list, etc.) and a widget content UI on a screen. For example, the display 100-3 may provide a widget content corresponding to the application topic to be subscribed by a user and user status information on a screen. The display 100-3 may provide various user interfaces and graphic user interfaces (GUI) according to an embodiment of the disclosure.

The display 100-3 may be a touch display or a three-dimensional display for displaying a 3D image.

The memory 100-4 may store a program for the operation of the processor 100-8. The memory 100-4 may temporarily store input/output data.

The memory 100-4 may be implemented as a nonvolatile memory, a volatile memory, a flash memory, a hard disk drive (HDD), or a solid state drive (SSD). The memory 100-4 is accessed by the processor 100-8, and the reading/recording/modification/deletion/update of data by the processor 100-8 can be performed. The memory 100-4 may be a storage medium of at least one type selected from the group consisting of ROM, RAM, electrically erasable programmable read-only memory (EEPROM), programmable read-only memory (PROM), magnetic memory, magnetic disk, etc.

The speaker 100-5 may output various sounds.

The input unit 100-6 may transmit the signal input by a user to the processor 100-8. The input unit 100-6 may transmit commands or data input by the user through an input/output device (e.g., a sensor, a keyboard or a touch screen) to the communicator 100-2, the memory 100-4, the processor 100-8, etc. The input unit 100-6 may provide data on the user's touch input through the touch screen to the processor 100-8.

The input unit 100-6, according to an embodiment, may generate input data for controlling the operation of the wearable apparatus 100. For example, the wearable apparatus 100 may select a topic of an application to be subscribed through the input unit 100-6 (e.g., a subscriptionable topic widget list, etc.) and a widget provided to the display 100-3 (e.g., a widget content UI), and receive additional command for the selected application topic and the widget.

The interface unit 100-7 may serve as an interface with an external device connected to the wearable apparatus 100. The external device may be, for example, a card socket such as a wired/wireless headset, an external charger, a subscriber identification module (SIM) card, an earphone, and the like.

The processor 100-8 may control the operation of each unit according to an embodiment of the disclosure, and control the overall operations of the wearable apparatus 100.

The processor 100-8 may select an application topic (e.g., a subscriptionable topic widget list, etc.) to be provided from an external server according to a user command, and receive information (e.g., a widget content UI) on the selected application topic and on at least one application corresponding to the status information of the user received from the external server through the communicator 100-2, and provide a widget corresponding to the application selected by a user command among at least one application, to a screen. The widget provided on the screen may refer to UI data including a widget content of the application corresponding to the user status information.

The processor 100-8 may set a user command so that the widget corresponding to a designated application in a specific context may be preferentially provided on a screen among at least one application.

Information on at least one application corresponding to the user information of the user may be UI (user interface) data including content data corresponding to the application provided from the server.

The processor 100-8, when at least one application includes a plurality of applications, may provide a widget corresponding to each of the plurality of applications on a screen in order of scrolling according to a user command of selecting one widget and then scrolling the widget.

The processor 100-8, when selecting a widget according to a user command, may provide a screen in which a web-application connected to a widget is executed.

The processor 100-8, when there is no web-application connected to the widget, may request a web-application to an external server, and provide a web-application page provided from the external server to a screen.

The processor 100-8, when user status information is periodically transmitted to the external server, or the user status information satisfies a predetermined condition, may control the communicator 100-2 to transmit the user status information to the external server.

The processor 100-8, when there is an application corresponding to an application set by a user among a plurality of applications in a list, may provide a widget corresponding to the application set by the user.

Figure 3:
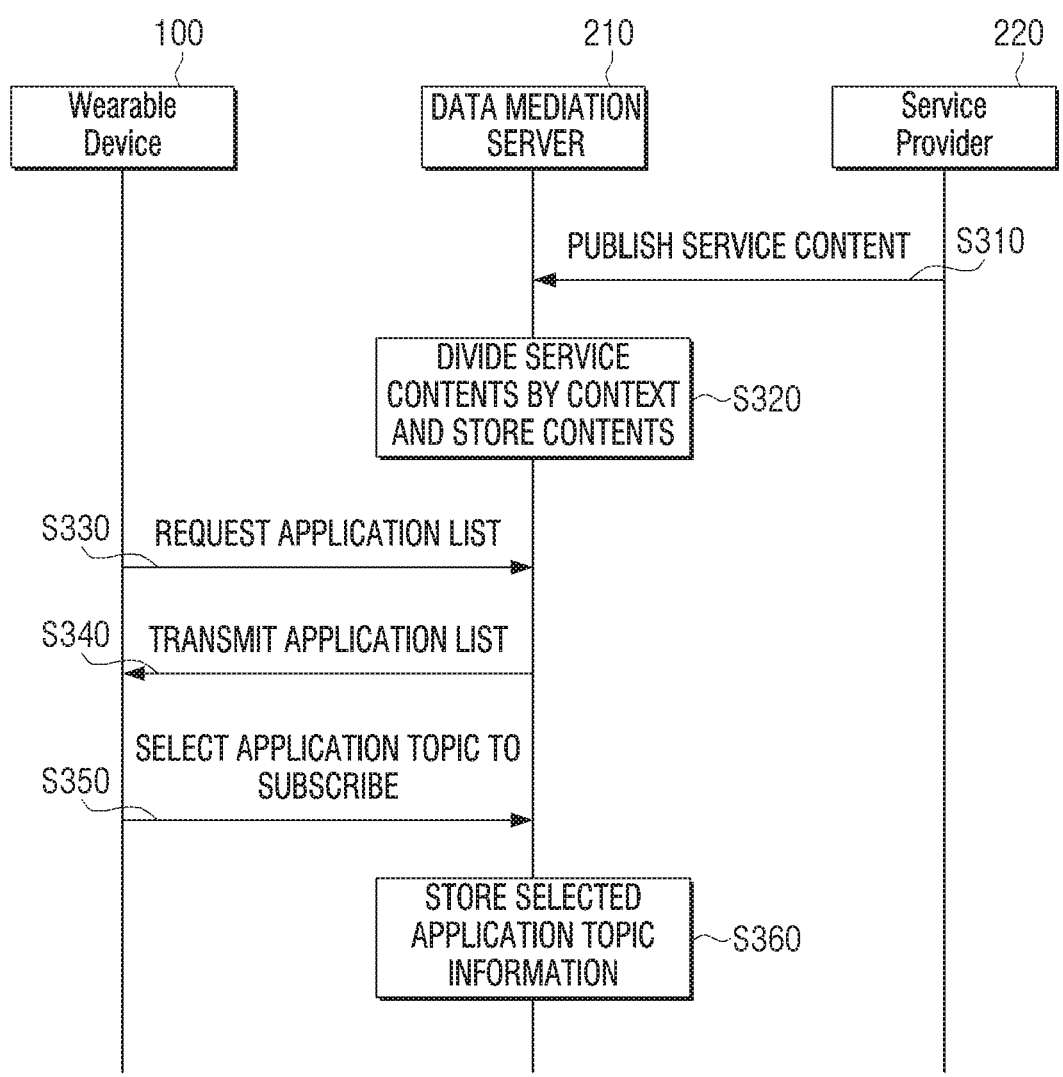
FIG. 3 is a sequence view illustrating a system for providing a widget to a wearable apparatus according to an embodiment of the disclosure.
Figure 4:
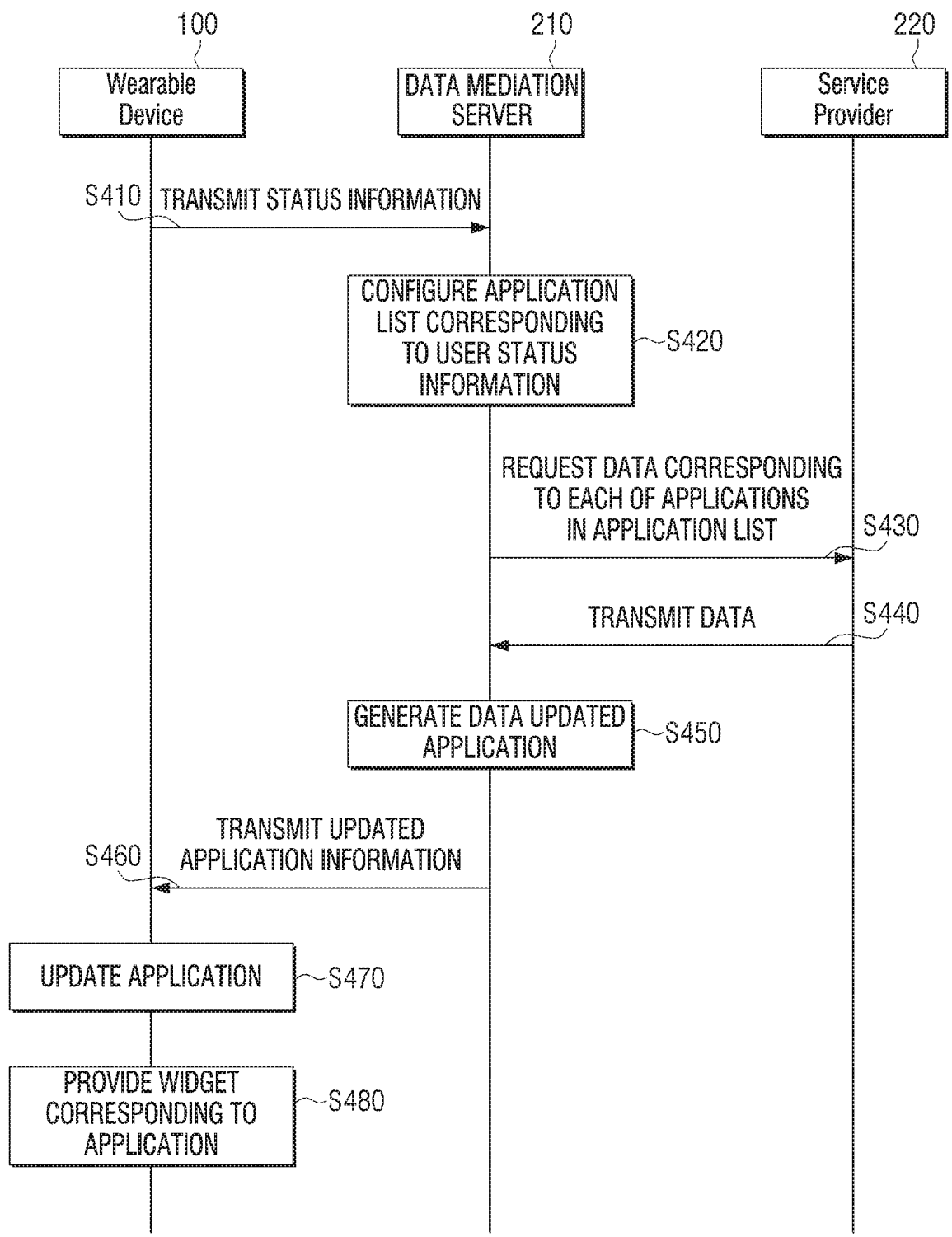
FIG. 4 is a sequence view illustrating a system for providing a widget to a wearable apparatus according to an embodiment of the disclosure.
Figure 5:
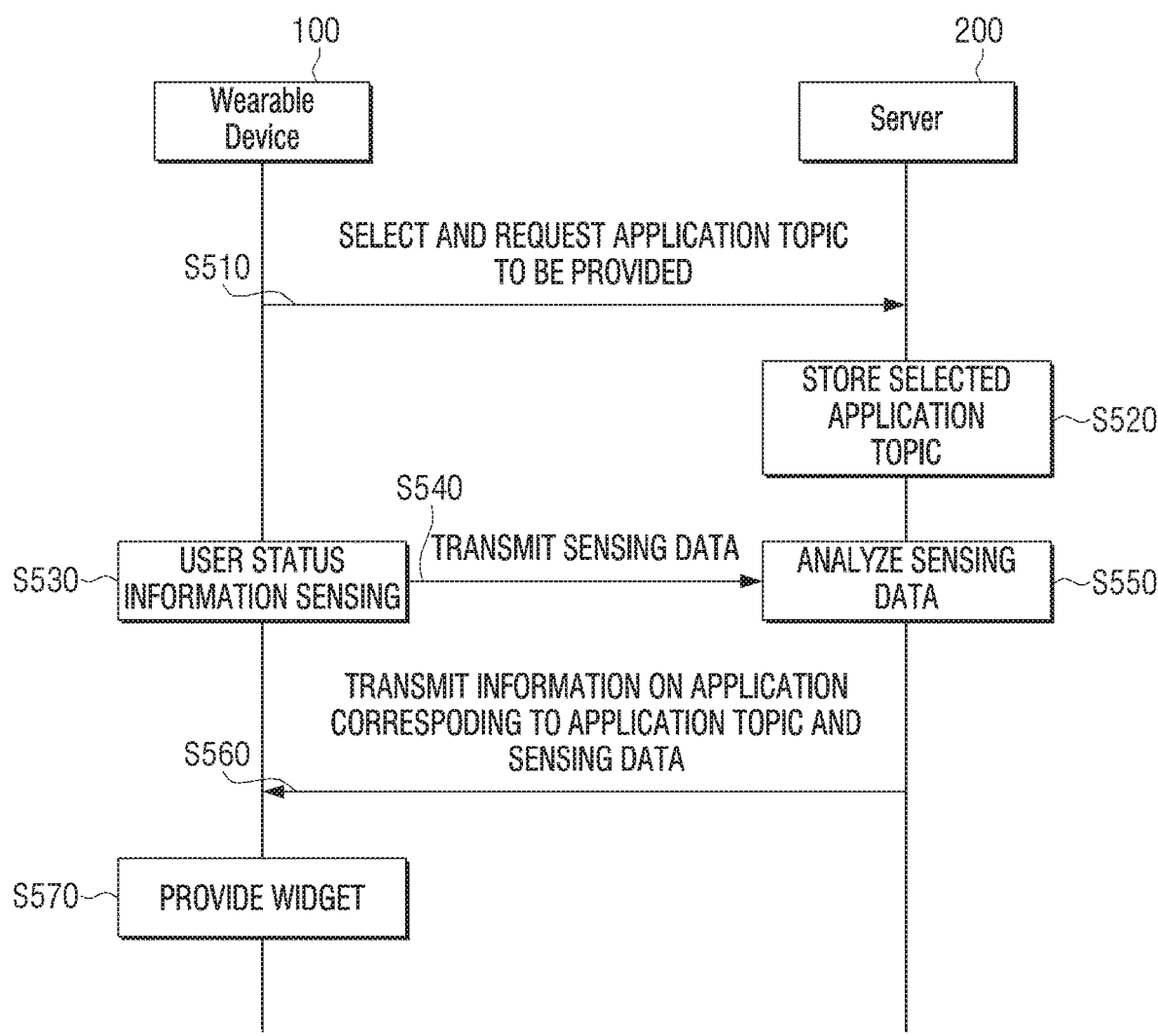
FIG. 5 is a sequence view illustrating a system for providing a widget to a wearable apparatus according to an embodiment of the disclosure.

FIG. 3, FIG. 4, and FIG. 5 are sequence views to explain a system for providing a widget to a wearable apparatus according to an embodiment of the disclosure.

FIG. 3 illustrates an initial step in which a wearable apparatus 200 receives a widget service from the data mediation server 210, which is an external server, and a service provider 220.

Referring to FIG. 3, at step S310, the service provider 220 may produce contents related to various services to be subscribed by a subscriber and transmit the contents to the data mediation server 210. For example, various services may be weather, health care, navigation map, metro map, shopping coupon, etc., but is not limited thereto.

At step S320, the data mediation server 210 may divide various contents which is information on various services received from the service provider 220 by contextual format of a user and store the contents. The data mediation server 210 may divide the service content received from the service provider 220 by topic and store the contents.

For example, the data mediation server 210 may store a service content received from the service provider 220 by topic such as a service content related to "health", a service content related to "economy", a service content related to "news", or the like.

In addition, the data mediation server 210 may analyze status information of users using the wearable apparatus 100 such as a health care service content related to a jogging situation, a healthcare service content related to a marathoning situation, a service content related to a place such as a theater and a shopping mall, or the like, divide service contents by various situations, and store the service contents in a repository of the data mediation server 210.

At step S330, the wearable apparatus 100 may mount and execute a widget instant application "Widget Viewer" by a user command. The widget instant application may not download and mount a widget that a user wishes from a server and mount the widget in the wearable apparatus 100, but may receive a UI content corresponding to the widget from the server and provide a widget page on a screen.

When the widget instant application is executed by the wearable apparatus 100 by a user command, the user of the wearable apparatus 100 may request an application list to subscribe to the data mediation server 210. The user may request information on widget to be subscribed in the wearable apparatus 100 to the data mediation server 210.

For example, the user may request an application topic (e.g., a widget topic, or the like) to be subscribed by the wearable apparatus 100.

At step S340, the data mediation server 210 may list and subscribe application types that can be subscribed in the wearable apparatus 100. For example, the application topic may be widget list information classified as a topic in the data arbitration server 210 such as "weather", "healthcare", "map", "stock", "air ticket", or the like.

At step S350, the wearable apparatus 100 may select an application topic to subscribe according to a user command, and transmit the selected application topic information to the data mediation server 210. The wearable apparatus 100 may select at least one application topic by a user command. The wearable apparatus 100 may select specific applications to be subscribed among applications included in the selected application topic by a user command. The information on specific applications selected by the user may be transmitted to the data mediation server 210.

At step S360, the data mediation server 210 may store the application topic information selected by the wearable apparatus 100 in a storage unit. The data mediation server 210 may match device information with respect to the wearable apparatus 100 with the selected application topic information and store the information in the storage unit as user based information.

FIG. 4 is a sequence view illustrating a system for receiving a widget according to status information of a wearable apparatus according to an embodiment of the disclosure.

Referring to FIG. 4, at step S410, a wearable apparatus 100 may sense status information of a user using the wearable apparatus 100, and transmit the information to the data mediation server 210. The wearable apparatus 100 may sense the status information of the user by using various sensors mounted in the wearable apparatus 100.

For example, the wearable apparatus 100 may transmit the movement speed of the user sensed by an acceleration sensor to the data arbitration server 210. In addition, the wearable apparatus 100 may transmit the altitude of the environment sensed through an atmospheric pressure sensor to the data mediation server 210. The above-described examples are illustrative of the disclosure, but are not limited thereto.

The wearable apparatus 100, when user status information is periodically transmitted to the data mediation server 210, and the user status information satisfies a predetermined condition, may transmit the user status information to the data mediation server 210 even if it is not a transmission period.

For example, a predetermined condition may be a case where user's pulse rate suddenly increases beyond a normal value. The above-described example is only illustrative, but is not limited thereto.

At step S420, the data mediation server 210 may analyze status information of a user received from the wearable apparatus 100 and identify user context (e.g., an activity type). For example, the data mediation server 210 may identify whether a user walks, or runs based on the moving speed of the user. The wearable apparatus 100 may directly identify user's context (e.g., a user walks or runs) based on the information sensed by the sensor mounted in the wearable apparatus 100 and transmit the identified result to the data mediation server 210.

The data mediation server 210 may identify that a user is moving by a moving means such as a car, when the user's movement speed is equal to or greater than a predetermined speed. For example, the data mediation server 210 may identify the location of the user by analyzing latitude and longitude when the received user's status information is altitude information. The data mediation server 210 may use the altitude information together with the GPS information to identify where the user is located such as mountain, building, etc. according to the user's location.

The data mediation server 210 may more clearly specify the user status information using the specific wearable apparatus 100 based on database of the user status information received from various electronic apparatuses.

The data mediation server 210 may form an application list corresponding to the user status information based on the identified status information of the user.

For example, the data arbitration server 210 may configure a list of climbing-related applications when the identified user's status information is an altitude of a mountain. In another example, the data mediation server 210 may configure a jogging related health care application list when the status information of the user analyzed based on the identified user status information is "during jogging". The above-described example is only one embodiment for explaining the disclosure, but is not limited thereto.

At step S430, the data mediation server 210 may request data respectively corresponding to applications in an application list corresponding to the user status information to the service provider 220. The data may be a widget content related to a service (e.g., healthcare, news, economy, weather, etc.) produced by the service provider 220.

At step S440, the server provide 220 may transmit data corresponding to each application request by the data mediation server 210.

At step S450, the data mediation server 210 may update data of each application in the application list corresponding to the user status information and generate an application.

The data mediation server 210 may update data of each application provided by the service provider 220 in a UI layout frame which is pre-stored in the storage, and generate a widget page UI as information on the application corresponding to the status information of the user.

At step S460, the data mediation server 210 may transmit the updated application information including the generated application information to the wearable apparatus 100.

At step S470, the wearable apparatus 100 may update an application corresponding to the application topic selected at step S350 of FIG. 3 based on the updated application information (a widget page UI) received from the data mediation server 210. For example, the wearable apparatus 100 may update a screen "Widget Viewer", which is an instant widget mounted at step S330 of FIG. 3, to the updated application UI information received from the data mediation server 210 and provide the information to the screen. For example, the wearable apparatus 100 may update the instant widget screen to a screen including a widget page UI content generated by the data mediation server 210.

At step S480, the wearable apparatus 100 may provide a widget corresponding to an application suitable for user status information.

For example, at an initial step of FIG. 3 of the wearable apparatus 100, "healthcare application" may be included in an application topic list to subscribe which is selected according to a user command, and the user status information identified by the data mediation server 210 based on the user status information may be "on running". The data mediation server 210 may request content information (data) of an application related to jogging to the server provider 220, and generate a jogging related application (widget). The generated jogging related application may be UI content information obtained by updating the jogging related content on a UI layout of the pre-stored widget page.

The wearable apparatus 100 may receive UI information of the updated jogging related application from the data mediation server 210. The wearable apparatus 100 may receive widget including a UI content (e.g., a widget page) corresponding to the jogging related application from the data mediation server 210 and display the jogging related UI content on a screen "Widget Viewer".

A user may select the widget displayed on the screen of the wearable apparatus 100, but the UI content of the application corresponding to the widget may not be provided. The wearable apparatus 100 may request an application content corresponding to the widget to the data mediation server 210. The data mediation server 210 may request application related content data to the service provider 220. Therefore, the wearable apparatus 100 may be provided with an application UI content corresponding to a widget selected based on the content of the application transmitted to the data mediation server 210 from the service provider 220.

When the user selects a widget displayed on the screen of the wearable apparatus 100, an application corresponding to the widget (a jogging application generated by the data mediation server 210) may be executed. In other words, when at least one widget is selected from the screen of the wearable apparatus 100 by a user command, a web-application connected to a widget may be executed.

When there is no web application connected to the widget selected by a user command, the wearable apparatus 100 may request a web-application to the data mediation server 210, and a web application execution screen provided from the data mediation server 210 may be provided on the screen.

When the wearable apparatus 100 cannot be provided with a web-application related to the widget from the data mediation server 210, the wearable apparatus 100 may directly request a web application to the service provider 220, and download an application related to a specific application that can download a web application (e.g., play store of Android™).

When the wearable apparatus 100 receives a list including a plurality of applications from the data mediation server 210, the user may select one of the plurality of applications in the list. When the user selects one of the plurality of applications, a widget corresponding to the selected application may be provided to the screen of the wearable apparatus 100.

The wearable apparatus 100 may set a user command so that the widget corresponding to the designated application in a specific context may preferentially be provided on the screen.

For example, the wearable apparatus 100 may be provided with application information according to user status information from the data mediation server 210. The wearable apparats 100 may be set by a user in advance so that a specific application, not the application provided from the data mediation server 210 may be provided to the screen in a specific occasion. Therefore, although a user does not select a widget on a screen, the wearable apparatus 100 may automatically provide an application corresponding to a specific situation on a screen in a situation sensed by the wearable apparatus 100, which is set by a user.

For example, the wearable apparatus 100 may be set to execute a widget corresponding to a specific application (e.g., stock information) in a certain time zone (e.g., 2:00 to 3:00 pm) by the user. When the user status information identified by the data mediation server 210 based on the user status information indicates that the user is climbing mountain, the data mediation server 210 may provide a climbing-related application information to the wearable apparatus 100, but when there is a stock related application among a plurality of applications provided by the data mediation server 210, the widget corresponding to the stock application may be provided on the screen of the wearable apparatus 100.

FIG. 5 is a sequence view to explain a method for providing a widget in a wearable apparatus and a server according to an embodiment of the disclosure.

Referring to FIG. 5, at step S510, a wearable apparatus 100 may select an application topic to be provided (to be subscribed) from a server 200 and request the related information to the server 200. The related information may be UI information of a widget content corresponding to the application topic provided from the server 200 and the user status information. When mounting and executing an instant widget "Widget Viewer", the wearable apparatus 100 may receive an application topic that can be subscribed from the server 200. The wearable apparatus 100 may select an application topic to be subscribed by the wearable apparatus 100 among application topics provided from the server 200. At step S520, the server 200 may store an application topic selected by the wearable apparatus 100 together with device information of the wearable apparatus 100 in a database.

At step S530, the wearable apparatus 100 may detect (sense) status information of a user based on sensors, GPS module, etc. mounted in the wearable apparatus 100.

At step S540, the wearable apparats 100 may transmit the sensed user's status information to the server 200.

At step S550, the external server 200 may analyze the status information of the user received from the wearable apparatus 100 and identify user's activity type and the information on the environment near the wearable apparatus 100.

At step S560, the server 200 may transmit the information on the application corresponding to the application topic and the user's status information to the wearable apparatus 100 based on the data obtained by analyzing the user's status information. The information on the application may include a UI content of the application corresponding to the user status information. The server 200 may generate a UI content of an application (e.g., widget) matched with application topic information selected by a user stored at step S520, and user's status information analyzed at step S550, and transmit the UI content to the wearable apparatus 100.

At step S570, the wearable apparatus 100 may provide widget information corresponding to the application on a screen based on the information on the application received from the server 200. According to an embodiment, the wearable apparatus 100 may not directly download the widget and mount the widget in the wearable apparatus 100, but may receive UI data of the widget from the server 200 and provide the widget information to the screen "Widget Viewer" executed at step S510.

The detailed operations of the wearable apparatus 100 and the server 200 have been described in FIG. 3 and FIG. 4.

FIG. 6A, FIG. 6B, FIG. 6C and FIG. 6D are views to explain a method for providing a widget of a wearable apparatus according to an embodiment of the disclosure.

Figure 6A:
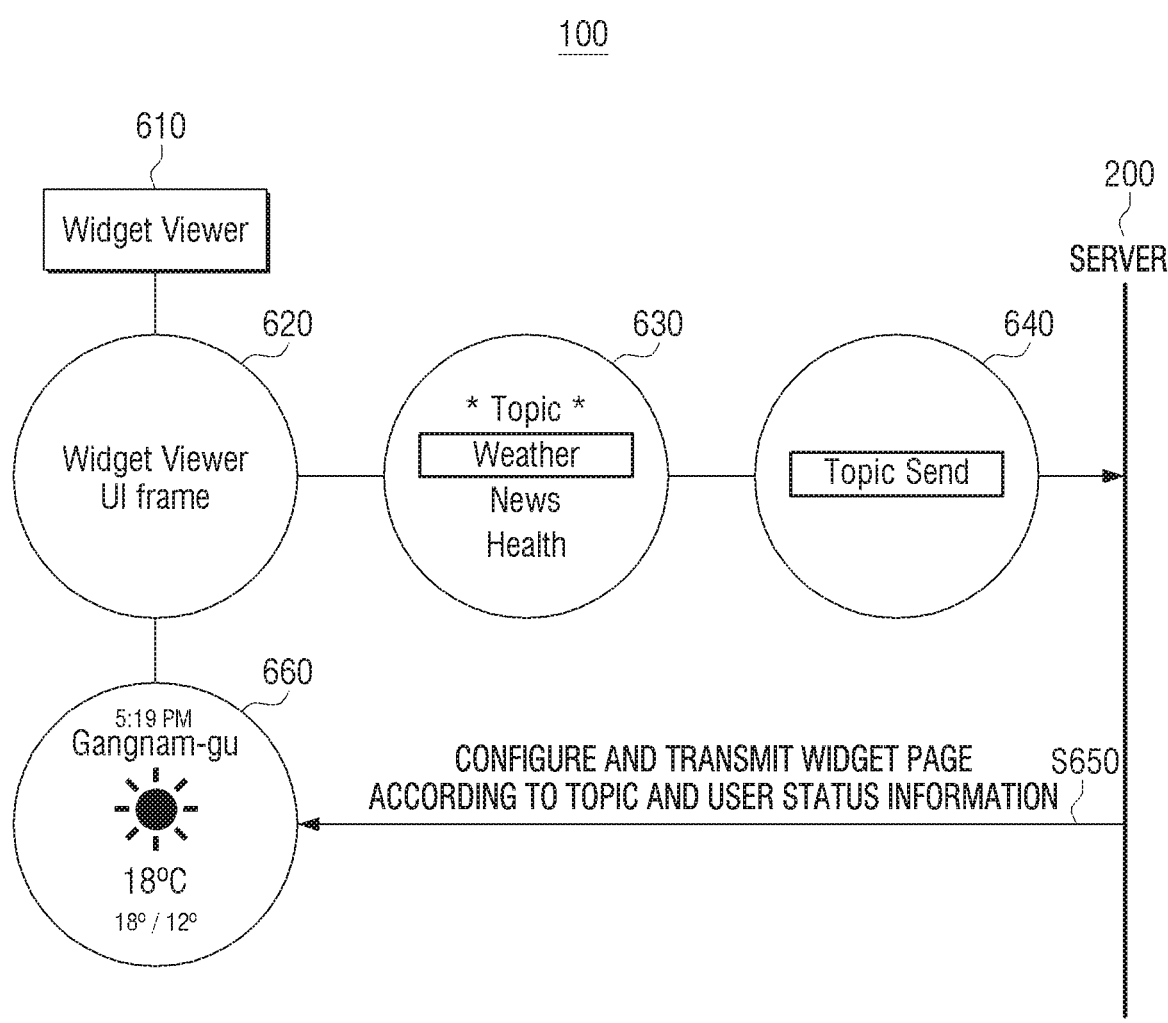
FIG. 6A is a view to explain a method for providing a widget of a wearable apparatus according to an embodiment of the disclosure.

FIG. 6A is a view to explain a widget execution screen of a wearable apparatus according to an embodiment of the disclosure.

Referring to FIG. 6A, according to an embodiment, the wearable apparatus 100 may mount and execute a widget instant application "Widget Viewer" 610. The "Widget Viewer" 610 may not download each of a plurality of widgets from the server 200 and mount the widget in the wearable apparatus 100, but may receive a UI content corresponding to a widget according to the status information of the wearable apparatus 100 and provide the UI content to the wearable apparatus 100.

When the "Widget Viewer" 610 is executed, a UI frame 620 of the "Widget Viewer" may be displayed on a screen of the wearable apparatus 100. The UI frame 620 may be provided from the server 200. The server 200 may store various widget UI layouts corresponding to a widget instant application to be provided to the wearable apparatus 100 in a storage. The wearable apparatus 100 may sense various user status information through a sensor, and transmit the sensed user status information to the server 200.

Referring to FIG. 3, the wearable apparatus 100 may be provided with an information list 630 with regard to an application topic that can be subscribed by the wearable apparatus 100 from the server 200.

As shown in FIG. 6, the application topic may be "weather", "news", "health", etc., and the wearable apparatus 100 may select at least one topic (e.g., "weather") among a plurality of application topics. The selected topic (e.g., weather) may be transmitted to the server 200.

At step S650, the server 200 may match "weather", which is topic information that is transmitted from the wearable apparatus 100 with user state information obtained from analyzing user status information and provide application information corresponding to the information to the wearable apparatus 200. The server 200 may overlay content data related to "weather" over a UI layout stored in a server, and generate a widget page (e.g., a widget UI content). The wearable apparatus 100 may provide a widget page 660 provided from the server 200 to a screen.

Figure 6B:
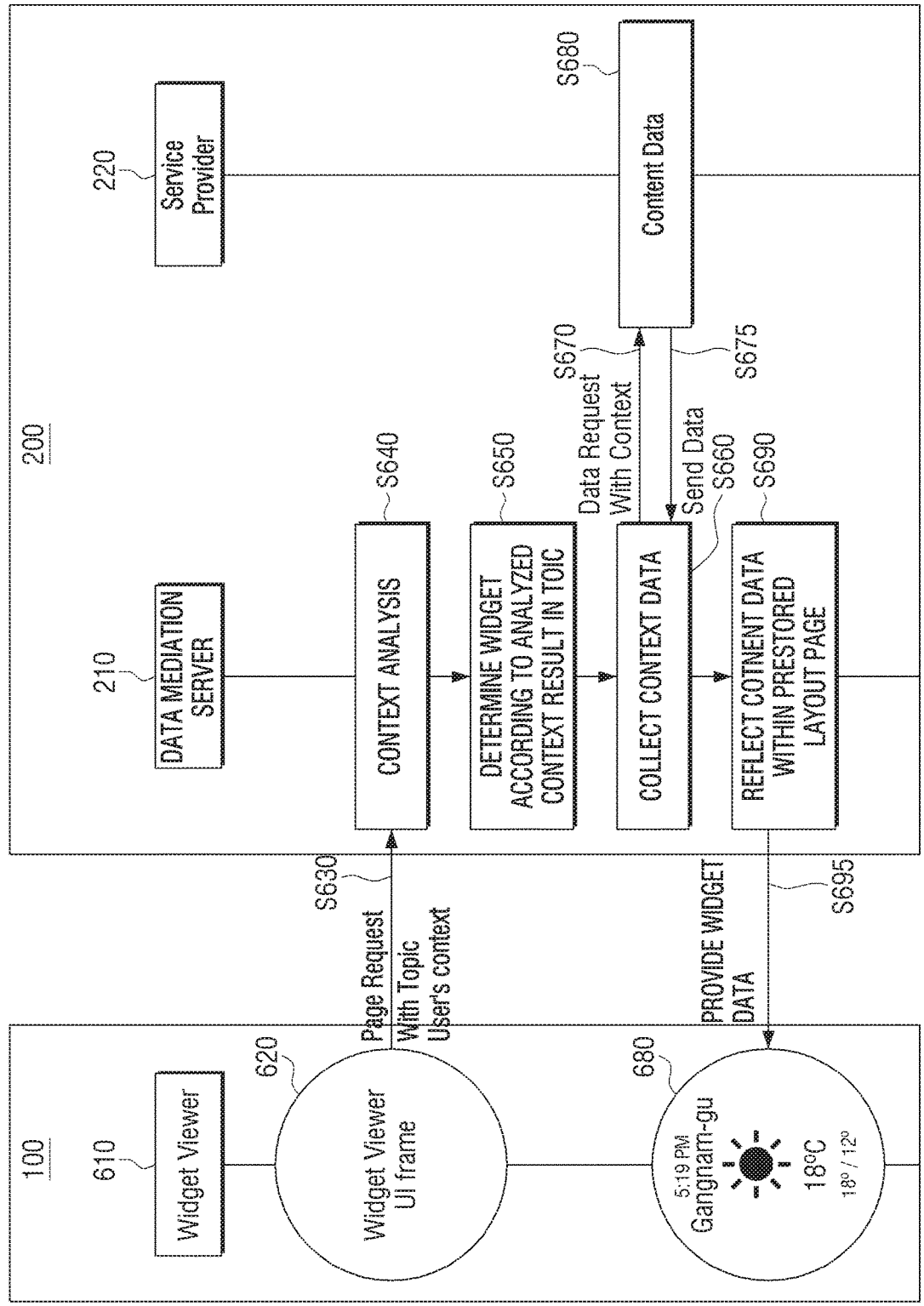
FIG. 6B is a view to explain a method for providing a widget of a wearable apparatus according to an embodiment of the disclosure.

FIG. 6B is a view to explain operations of a wearable apparatus and a server in view of UI.

Referring to FIG. 6B, the wearable apparatus 100 may execute a widget instant application "Widget Viewer" 610. When the "Widget Viewer" 610 is executed, a "Widget Viewer UI Frame" 620, which is a UI layout corresponding to the "Widget Viewer" 610 can be displayed on the wearable apparatus 100.

At step S630, the wearable apparatus 100 may transmit an application topic selected by a user command and various user status information sensed through a sensor from the wearable apparatus 100 to the data mediation server 210 of the server 200.

At step S640, the data mediation server 210 may analyze status information of a user (e.g., an activity type) based on user state information received from the wearable apparatus 100.

At step S650, the data mediation server 210 may identify a widget according to the analyzed user status information among application topics selected by a user, which are received from the wearable apparatus 100.

The data mediation server 210 may request content data related to the analyzed status information to the service provider 220 at step S670 to collect content data related to the analyzed status information at step S660.

The service provider 220 may publish content data related to various services to be provided to a subscriber at step S680, and transmit the content data requested from the data mediation server 210 to the data mediation server 210 at step S675.

At step S690, the data mediation server 210 may store a UI layout page corresponding to an instant widget, and update a widget page corresponding to user status information by reflecting content data provided from the service provider 220 in the pre-stored layout page.

At step S695, the data mediation server 210 may provide the updated widget page to the wearable apparatus 100.

The wearable apparatus 100 may display a widget page 680 received from the data mediation server 210 on a screen.

For example, the application topic selected by the user in FIG. 6A is "weather", and the user status information sensed by the user may be location information of the user via GPS. Accordingly, the data mediation server 210 may request the service provider 220 for weather-related content corresponding to the user's location (Gangnam-gu) based on GPS information. The data mediation server 210 may generate a page in which the UI content of "Widget Viewer" is updated by reflecting the content related to the weather of the Gangnam-gu provided from the service provider 220 to the pre-stored page layout. Accordingly, the wearable apparatus 100 may receive a widget page including the UI content related to the weather of Gangnam-gu from the data mediation server 210 and display the widget page on the screen.

According to an embodiment, the wearable apparatus 100 may not directly mount the widget related to weather in the wearable apparatus 100, but may be provided with a widget page according to status information analyzed based on the status information of the wearable apparatus 100 from the server 200.

FIG. 6C is a view to explain a method for providing a plurality of widget pages in a wearable apparatus according to an embodiment of the disclosure.

Referring to FIG. 6C, a server 200 may generate a plurality of widget pages 601, 602, 603, 604, 605 and 606 according to a plurality of application topics that can be subscribed by the wearable apparatus 100 and provide the widget pages to the wearable apparatus 100.

The wearable apparatus 100 may select at least one application topic among a plurality of subscriptionable applications and may be provided with a plurality of widget pages 601, 602 and 603 corresponding to the server 200.

In this case, when a user command for selecting and scrolling one of a plurality of widgets 601, 602, and 603 provided from the server 200 is input, the wearable apparatus 100 may provide widget pages 601, 602 and 603 respectively corresponding to the plurality of widgets on a screen in a scrolling order.

A method for providing a widget according to an embodiment may comprise displaying a UI corresponding to each widget provided from the server 200 on the screen of "Widget Viewer", which is an instant widget application installed and executed in the wearable apparatus 100 in a scroll order. That is, the wearable apparatus 100 according to an embodiment of the disclosure may not download and execute each of the widgets 601, 602, and 603, and then scroll widget screen executed on the background to be provide to the screen. Therefore, it is possible to maximize the memory use efficiency of the wearable apparatus 100.

Figure 6D:
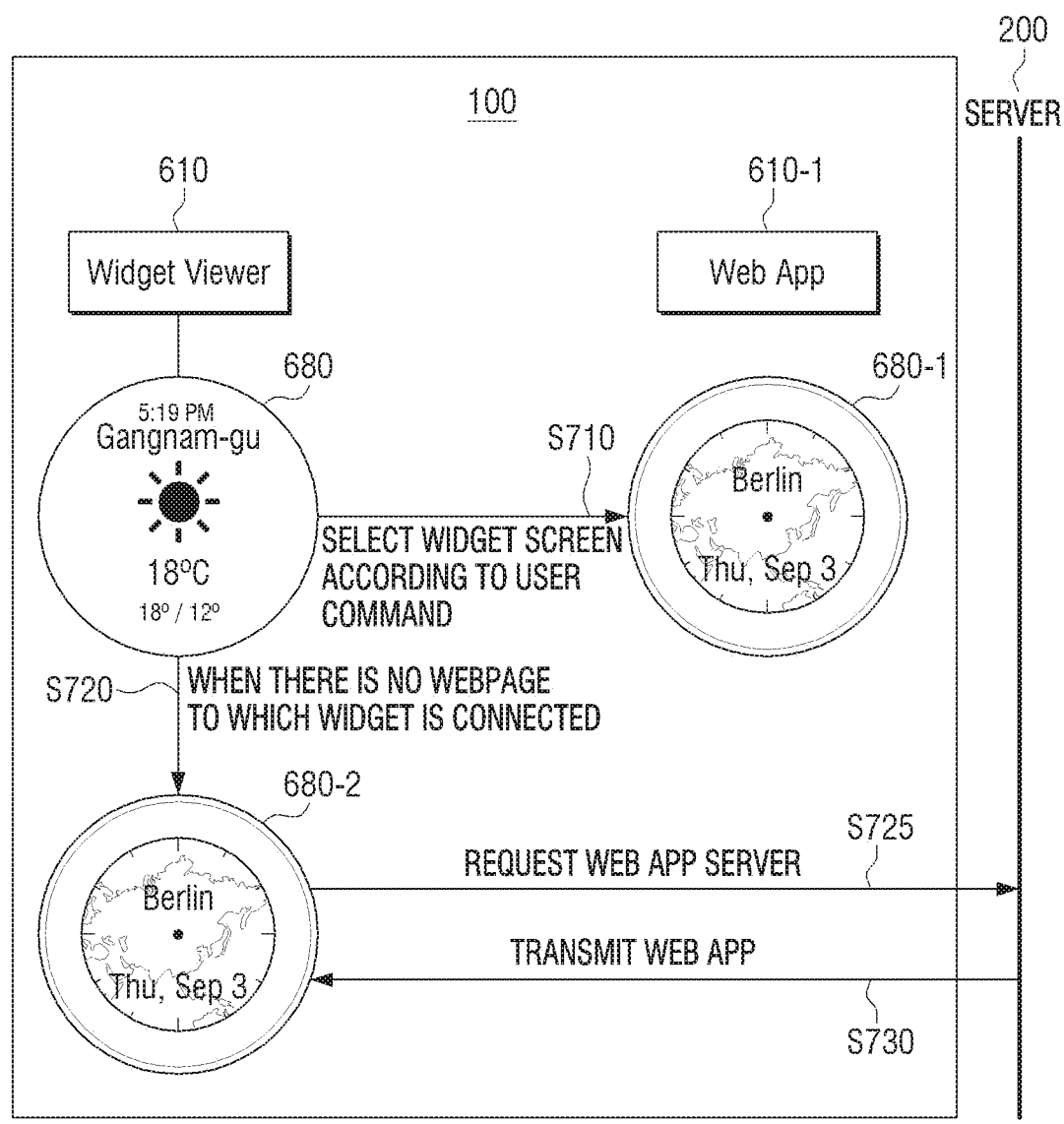
FIG. 6D is a view to explain a method for providing a widget of a wearable apparatus according to an embodiment of the disclosure.

FIG. 6D is a view to explain a method for providing a web-application corresponding to a widget according to an embodiment of the disclosure.

Referring to FIG. 6D, a wearable apparatus 100 may mount and execute an instant widget application "Widget Viewer" (610). The wearable apparatus 100 may select a weather widget 680 displayed on a screen of the wearable apparatus 100 by a user command at step S710. The user command may be embodied in various ways such as touching, sensing a user's gesture, etc. The wearable apparatus 100 may execute a web-applications 610-1 and 680-1 connected to a widget selected by a user command.

When there is no web-page connected to the widget selected by a user command at step S720, the wearable apparatus 100 may request a web application to the server 200 at step S725, execute a web-application provided from the server 200 at step S730, and provide the web-application to the screen at step S680-2.

When the wearable apparatus 100 fails to receive a web application from the server 200, the wearable apparatus 100 may download a related application from a specific application (e.g., the play store of Android™) that can download a web-application.

FIG. 7, FIG. 8, FIG. 9, and FIG. 10 are views to explain a method for providing a widget in a wearable apparatus according to an embodiment of the disclosure. However, the above-described examples are illustrative to explain the disclosure, but is not limited thereto.

Figure 7:
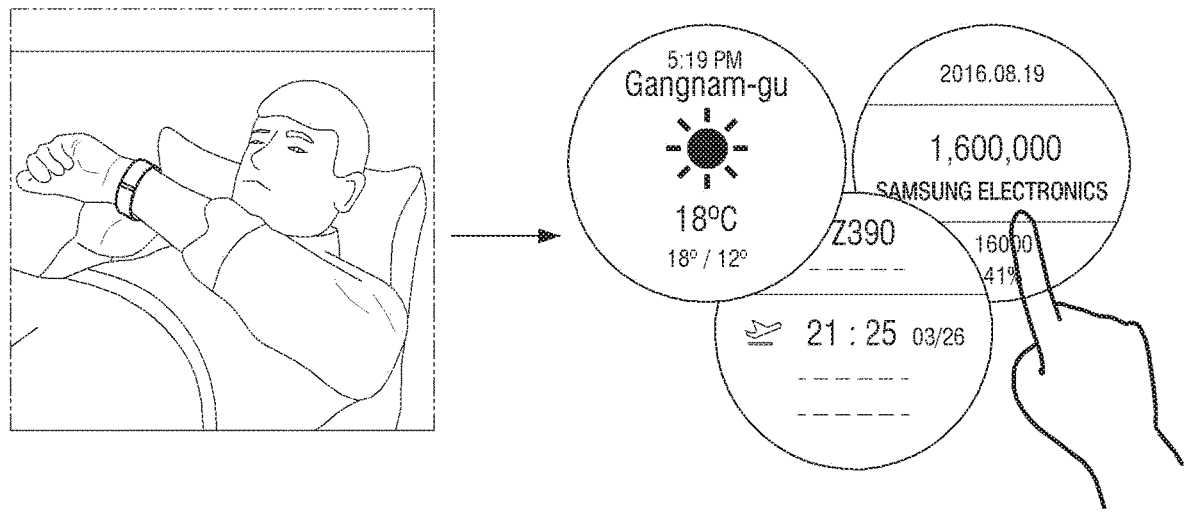
FIG. 7 is a view to explain a method for providing a widget of a wearable apparatus according to an embodiment of the disclosure.
Figure 7:
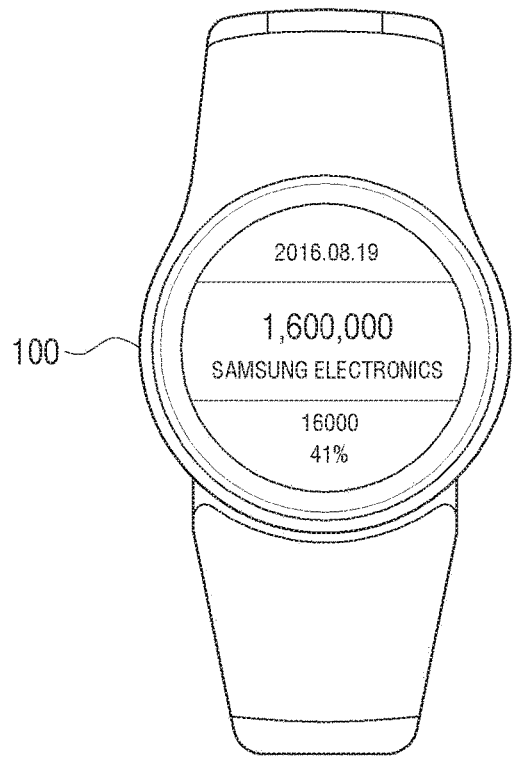

FIG. 7 is a view to explain a situation in which a user using a wearable apparatus 100 uses the wearable apparatus 100 indoor.

Referring to FIG. 7, a user may be located in a general place, unlike a shopping mall, a theater, a subway station, and the like. In addition, the wearer uses the wearable apparatus 100 in a posture in which the user does not move much. Therefore, the wearable apparatus 100 may sense the current position information of the user by using GPS or Near Field Communication method (BLE, Bluetooth low energy or NFC). In addition, the wearable apparatus 100 may sense the status information of the user through other sensors.

For example, the wearable apparatus 100 may automatically provide a widget including weather information provided from an external server, a widget regarding airport information, and a widget regarding stock information based on the status information of a user who stays indoor.

The user may check data corresponding a widget on an entire screen of the wearable apparatus 100 by selecting a widget regarding stock information, which is one of the provided widgets. The wearable apparatus 100 may set a specific widget (e.g., a stock widget) to be automatically provided at a specific situation (e.g., a specific time period) of a specific place (e.g., a living room of home) by a user.

A plurality of widgets provided from an external server may be mounted in the wearable apparatus 100 and sequentially provided by commands such as a scroll command of a user, a user gesture command, etc. on a screen "Widget Viewer". However, the above-described examples are only for exemplary, but is not limited thereto.

Figure 8:
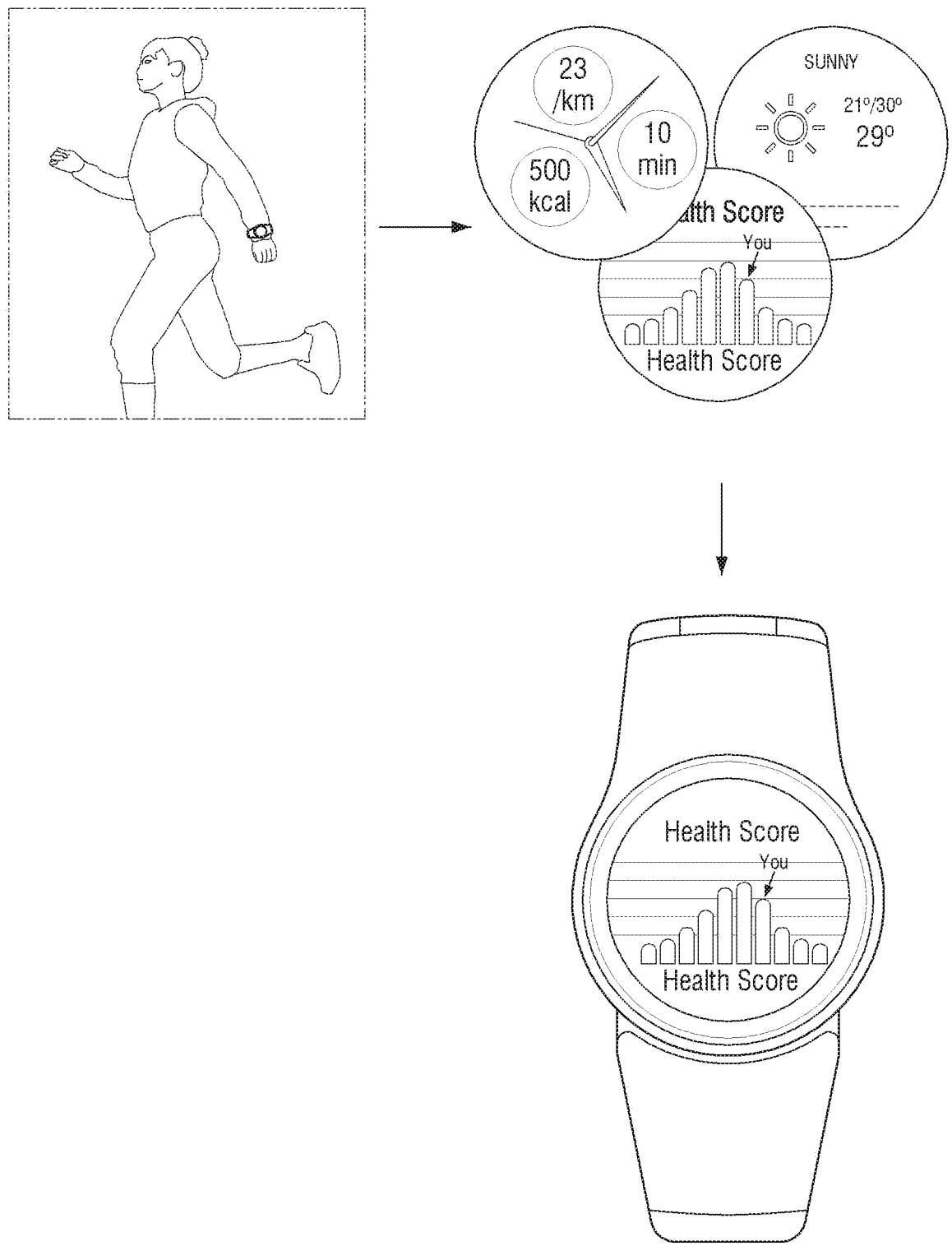
FIG. 8 is a view to explain a method for providing a widget of a wearable apparatus according to an embodiment of the disclosure.

FIG. 8 is a view illustrating a situation in which a user using a wearable apparatus 100 uses the wearable apparatus 100 moving at more than a predetermined speed.

Referring to FIG. 8, the user is running outdoors at a certain speed or more. For example, the wearable apparatus 100 can detect a moving speed of a user, a temperature of a user, a body temperature of a user, a heart rate of a user based on an acceleration sensor, a temperature sensor, a pulse sensor and the like. Also, the wearable apparatus 100 may acquire the current position information of the user through the GPS module. The wearable apparatus 100 may receive pedometer, running, and weather related widgets based on the user's status information from an external server.

The user may select one of widget provided from an external server and check data corresponding to the selected widget. A widget (e.g., health data) matched with the widget preset by a user among widgets provided from an external server may be displayed on an entire screen of the wearable apparatus automatically.

Figure 9:
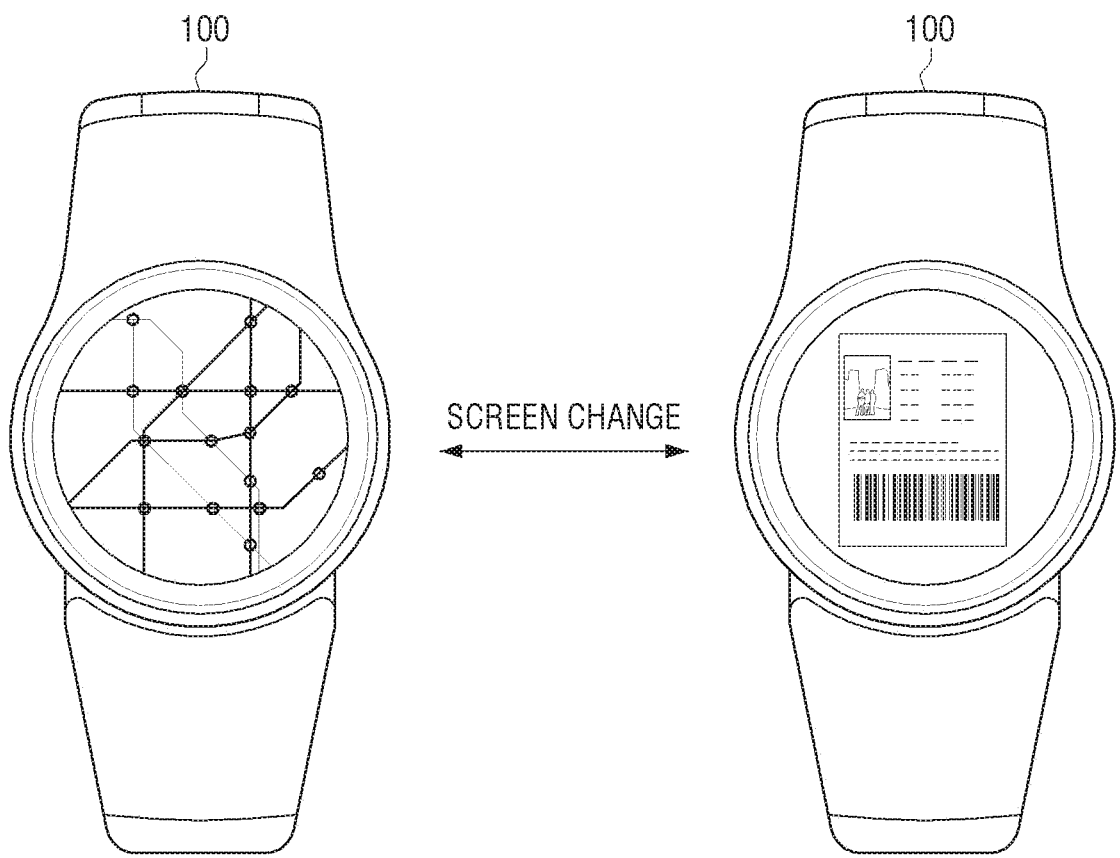
FIG. 9 is a view to explain a method for providing a widget of a wearable apparatus according to an embodiment of the disclosure.

FIG. 9 is a view illustrating a situation in which a user using a wearable apparatus uses the wearable apparatus 100 moving in a specific places indoor and outdoor.

Referring to FIG. 9, for example, a user may move to a theater by subway from a subway station. The wearable apparatus 100 may obtain current location information of a user through a GPS module when the user is situated at the subway station. The external server may provide a subway map, which is a map application, to a widget. In addition, the user may leave from the subway station and go into a theater. When the user enters the theater, the wearable apparatus 100 may transmit to the external server the user's current location information, a near field wireless communication signal obtained through, NFC, BLE, or the like. The external server can provide the wearable apparatus 100 with a widget related to coupon data available in the theater, indoor map data of the theater, movie ticket information and the like based on the user status information. That is, the widget that is provided to the wearable apparatus 100 according to the status information of the user using the wearable apparatus 100 may be automatically changed and provided.

Figure 10:
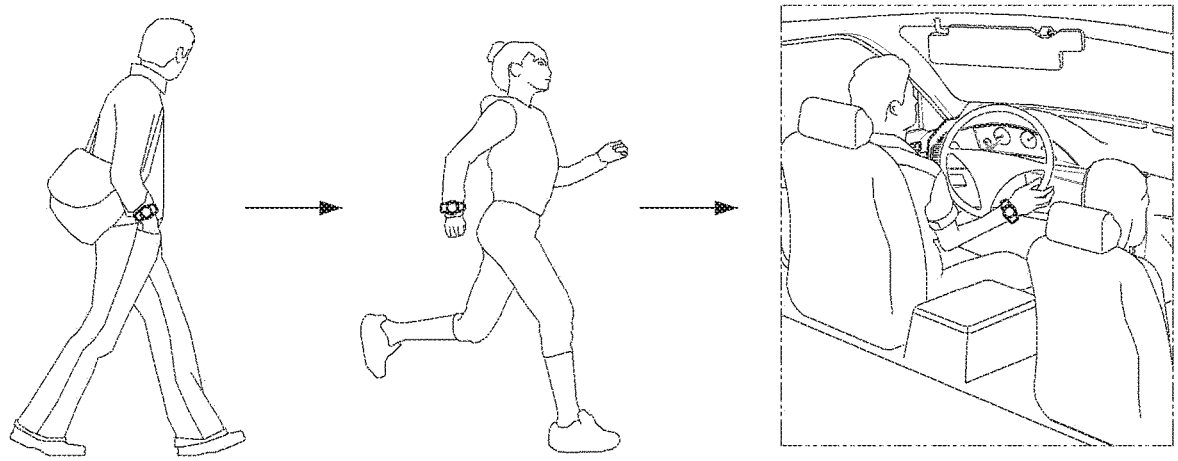
FIG. 10 is a view to explain a method for providing a widget of a wearable apparatus according to an embodiment of the disclosure.
Figure 10:
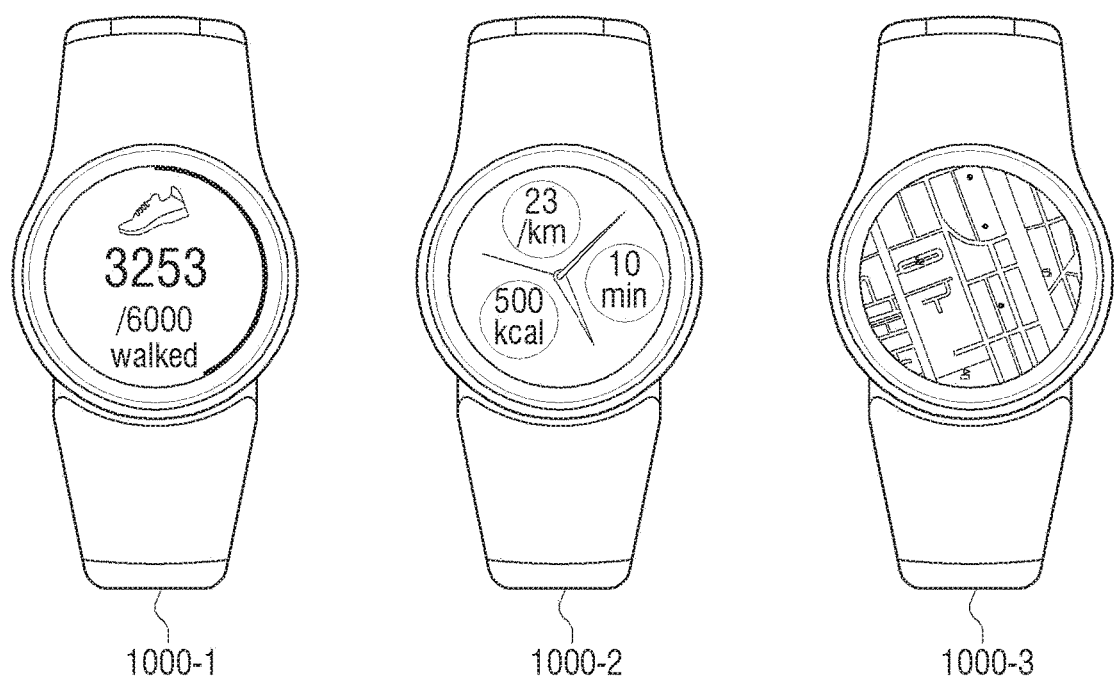

FIG. 10 is a view to explain a method for providing a widget when the status of a user using a wearable apparatus 100 is continuously changed.

Referring to FIG. 10, when a user walks, the wearable apparatus 100 may provide a walker 1000-1 widget. When a user walks, and then runs, the wearable apparatus 100 may provide a runner 1000-2 widget. When the user runs, and then drives a vehicle, the wearable apparatus 100 may provide a navigation 1000-3 widget. Based on the status information of the user sensed based on various sensors and communication modules mounted in the wearable apparatus 100, the wearable apparatus 100 may be provided with a widget matched with the status information of the user from the external server. Therefore, the wearable apparatus 100 may automatically provide a widget suitable for a user according to the status information of the user.

According to embodiments of the disclosure, the widget provided to a user from the external server from the wearable apparatus 100 may be an application topic that the use wishes to receive at an initial step, and could be an application matched with one of applications selected in advance. Therefore, when the application topic request by the user matches an application published by an external server, the external server, which is a service provider, may provide and promote content (e.g., application) related to a service provided by a service provider to the user even if the information on the widget is not provided to the user.

Figure 11:
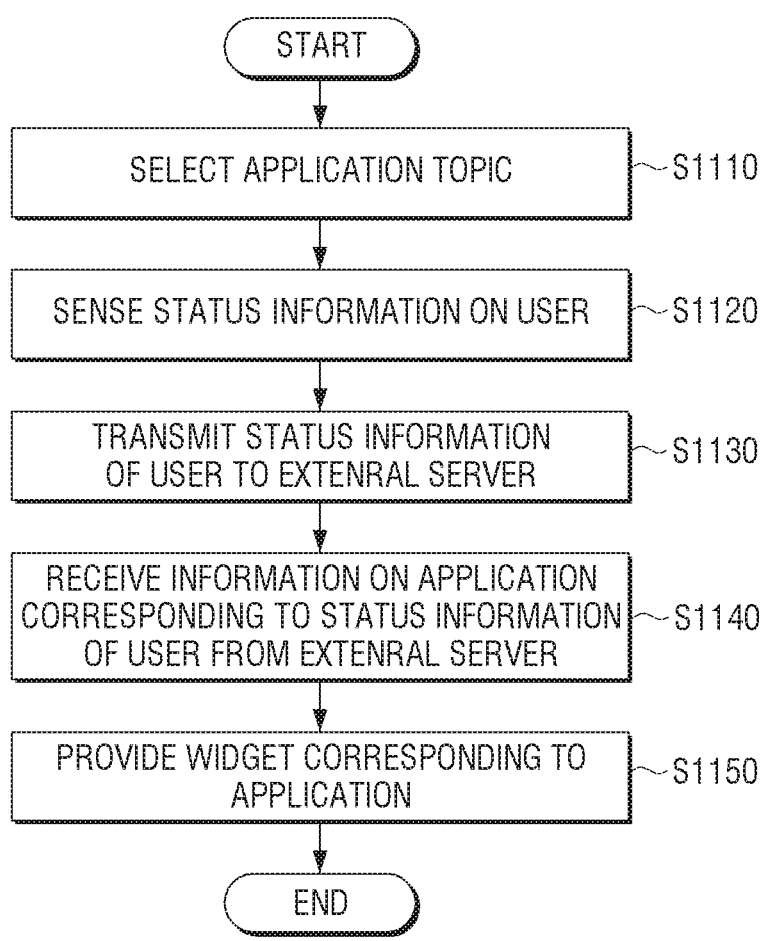
FIG. 11 is a flowchart to explain a method for providing a widget of a wearable apparatus according to an embodiment of the disclosure.

FIG. 11 is a flowchart to explain a method for providing a widget of a wearable apparatus according to an embodiment of the disclosure.

Referring to FIG. 11, at step S1110, the wearable apparatus 100 may select an application topic to be provided from an external server, and transmit the selected information to the external server. The application topic may be themes or topics of various applications such as "weather", "stock", "health", "map", "coupon", or the like.

At step S1120, the wearable apparatus 100 may sense status information of a user through various sensors. The wearable apparatus 100 may sense complex status information of the user by combining two or more types of sensors. For example, the wearable apparatus 100 may sense the moving speed and location information of the user through an acceleration sensor and a GPS module.

At step S1130, the wearable apparatus 100 may periodically transmit the sensed status information of the user to the external server. The wearable apparatus 100 may transmit the status information of the user to the external server when a specific event occurs in the sensed user state.

The wearable apparatus 100 may not analyze the sensed status information of the user, but may transmit only the sensed information to an external server. The external server may identify status information of a user such as the activity type or environment status of the user based on various data stored in a database.

At step S1140, the wearable apparatus 100 may receive information on an application corresponding to the status information of the user from the external server. The external server may divide applications executed by an external server by situation based on user information of various electronic apparatuses and store the applications in a repository. The external server may match context information of the user which is obtained by analyzing the received user status information (e.g., an activity type of the user) with the stored status information of the repository and provide the information on the matched application to the wearable apparatus 100.

At step S1150, the wearable apparatus 100 may provide a widget corresponding to an application based on information on the application received from an external server. The information on the application may include data corresponding to the application.

For example, when the status information of the user identified by the external server based on the user status information indicates that the user is jogging, the application topic corresponding to the user status information of the user may be "health care", and the application may be "runner". "Health care", and "runner" are only examples for illustrating the disclosure, but are not limited thereto. The widget corresponding to "runner" may be displayed on the entire screen of the wearable apparatus 100 as an icon representing the "runner" application. The data corresponding to the "runner" may be a user interface including real-time data such as pulse, calorie, and running distance of the user appearing on the screen of the wearable apparatus 100 when the user is jogging. For example, when the user selects the "runner" screen, an application including data corresponding to "runner" in the wearable apparatus 100 can be executed. Alternatively, even if the screen of the "runner" is not selected, the application including data corresponding to "runner" may be automatically executed in the wearable apparatus 100. The above-described exemplary embodiments are only examples for explaining the disclosure, and the invention is not limited thereto and can be implemented in various ways.

The methods according to exemplary embodiments of the disclosure may be implemented in the form of program commands that can be executed through various computer means and recorded in a computer-readable medium. The computer-readable medium may include program commands, data files, data structures, and the like, alone or in combination. For example, the computer-readable medium may be volatile storage or non-volatile storage such as ROM regardless of whether it is erasable or rewritable, a memory such as RAM, memory chip, device and integrated circuit, or a storage medium readable by a machine (e.g., a computer) as well as being optically or magnetically recordable such as CD, DVD, magnetic disk or magnetic tape.

It should be understood that the memory that is included within the wearable apparatus 100 is an example of programs containing commands for embodying embodiments of the disclosure or a machine-readable storage medium suitable for storing programs. The program commands recorded on the medium may be those specially designed and configured for the disclosure or may be available to those skilled in the art of computer software.

Although exemplary embodiments have been shown and described, it will be appreciated by those skilled in the art that changes may be made to these exemplary embodiments without departing from the principles and spirit of the disclosure.

Accordingly, the scope of the invention is not construed as being limited to the described exemplary embodiments, but is defined by the appended claims as well as equivalents thereto.

What is claimed is:

1. A system comprising:
an external server; and
a wearable apparatus comprising:
 a sensor;
 a communicator;
 a display;
 a memory; and
 a processor configured to:
  select an application topic, via a widget viewer application stored in the memory of the wearable apparatus, to be requested from the external server,
  transmit, via the communicator, information regarding the selected application topic to the external server and storing the information regarding the selected application topic in the external server,
  obtain user status information based on data sensed by the sensor and transmit the user status information to the external server via the communicator, the user status information comprising information indicating an activity type of a user,
  receive information on at least one application, as a widget page having a pre-stored layout, corresponding to the status information of the user and the selected application topic from the external server through the communicator,
  based on the received information on the at least one application, provide the widget page corresponding to the at least one application across an entire screen of the display of the wearable apparatus in the widget viewer application without downloading a widget corresponding to the at least one application, and
  update the widget page having the pre-stored layout based on the user status information by reflecting content data of the at least one application provided from the external server displayed on the display of the wearable apparatus.

2. The system of claim 1, wherein information on the at least one application includes user interface (UI) data including the content data corresponding to the at least one application.

3. The system of claim 2, wherein the processor is further configured to, based on the at least one application including a plurality of applications, provide a widget corresponding to each of the plurality of applications on the screen in a scrolling order based on a user command for selecting and scrolling the widget.

4. The system of claim 1, wherein the processor is further configured to, based on the widget being selected by a user command, execute a web-application connected to the widget.

5. The system of claim 4, wherein the processor is further configured to, based on there being no web application connected to the widget, request a web-application to the external server, and provide a web application page provided from the external server on the screen.

6. The system of claim 1, wherein the processor is further configured to set a user command to provide a widget corresponding to an application designated in a specific context among the at least one application on the screen.

7. The system of claim 1, wherein the processor is further configured to:
 control the communicator to transmit the status information of the user periodically, or
 based on the status information the user satisfying a predetermined condition, control the communicator to transmit the status information of the user to the external server.

8. A method for providing a widget on a wearable apparatus, the method comprising:
 selecting an application topic, via a widget viewer application stored in a memory of the wearable apparatus, to be requested from an external server;
 transmit, via a communicator, information regarding the selected application topic to the external server, and storing the information regarding the selected application topic in the external server;
 obtaining user status information based on data sensed by a sensor and transmit the user status information to the external server via the communicator, the user status information comprising information indicating an activity type of a user;
 receiving information on at least one application, as a widget page having a pre-stored layout, corresponding to the status information of the user and the selected application topic from the external server through the communicator;
 based on the received information on the at least one application, providing the widget page corresponding to the at least one application across an entire screen of a display of the wearable apparatus in the widget viewer application without downloading a widget corresponding to the at least one application; and updating a user interface (UI) layout of the widget page based on the user status information by reflecting content data of the at least one application provided from the external server displayed on the display of the wearable apparatus.

9. The method of claim 8, wherein information on the at least one application is UI data including content data corresponding to the at least one application within a UI layout page stored in the external server.

10. The method of claim 8, wherein the providing comprises, based on the at least one application including a plurality of applications, providing a widget corresponding to each of the plurality of applications on the screen in a scrolling order based on a user command for selecting and scrolling the widget.

11. The method of claim 8, wherein the providing further comprises executing a web application connected to the widget based on selecting the widget by a user command.

12. The method of claim 11, wherein the providing comprises, based on there being the web application not being connected to the widget, requesting the web application to the external server, and providing a web application UI provided from the external server on the screen.

13. The method of claim 8, wherein the providing comprises setting a user command to provide a widget corresponding a designated application in a specific context among the at least one application to the screen preferentially.

* * * * *